United States Patent

McManis

[11] Patent Number: 5,850,449
[45] Date of Patent: *Dec. 15, 1998

[54] SECURE NETWORK PROTOCOL SYSTEM AND METHOD

[75] Inventor: Charles E. McManis, Sunnyvale, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 858,785

[22] Filed: May 19, 1997

Related U.S. Application Data

[63] Continuation of Ser. No. 858,785, May 19, 1997, which is a continuation of Ser. No. 547,721, Oct. 26, 1995, Pat. No. 5,680,461.

[51] Int. Cl.⁶ .................................................. H04L 9/00
[52] U.S. Cl. ................................................. 380/25; 380/4
[58] Field of Search .................................. 380/4, 21, 25, 380/30; 395/683

[56] References Cited

U.S. PATENT DOCUMENTS

| | | | |
|---|---|---|---|
| 4,724,521 | 2/1988 | Carron et al. | |
| 5,367,573 | 11/1994 | Quimby | 380/25 |
| 5,388,264 | 2/1995 | Tobias, II et al. | 395/650 |
| 5,390,138 | 2/1995 | Milne et al. | 381/119 |
| 5,416,842 | 5/1995 | Aziz | 380/30 |
| 5,544,297 | 8/1996 | Milne et al. | 395/154 |
| 5,550,984 | 8/1996 | Gelb | 395/200.17 |
| 5,602,918 | 2/1997 | Chen et al. | 380/21 |
| 5,680,461 | 10/1997 | McManis | 380/25 |

*Primary Examiner*—Salvatore Cangialosi
*Attorney, Agent, or Firm*—Gary S. Williams; Flehr Hohbach Test Albritton & Herbert LLP

[57] ABSTRACT

A computer network having first and second network entities. The first network entity includes a packet object generator that generates a packet object including an executable source method, an executable destination method, and data associated with each of the methods. The first network entity also includes a communications interface to transmit the packet object. The second network entity includes a communications interface to receive the packet object and an incoming packet object handler to handle the received packet object. The incoming packet object handler includes a source and destination verifier to execute the source and destination methods with their associated data so as to verify the source and destination of the received object packet.

25 Claims, 6 Drawing Sheets

Network Data Packet 500

FIGURE 5

Packet Object 110

SECURE NETWORK PROTOCOL SYSTEM AND METHOD

This application is a continuation of patent application Ser. No. 08/858,785, filed May 19, 1997, which was a continuation of patent application Ser. No. 08/547,721, filed Oct. 26, 1995, now U.S. Pat. No. 5,680,461.

The present invention relates to systems and methods for sending packets of information between subscribers on a network, and particularly to a secure method of transmitting objects containing executable programs in place of conventional data packets in a network communication system.

BACKGROUND OF THE INVENTION

Prior art network protocols generally send messages as data packets. Each data packet contains a header and trailer, a data packet type identifier, and a payload that conforms to a protocol associated with the identified data packet type. From another viewpoint, the data packets of network protocols are currently defined in terms of request and response messages that are described as variable length records or data structures. Prior art protected networks use a filter on these data packet type identifiers to screen out undesired access to the networks.

However, prior art network protocols are becoming more flexible. For example, some new protocols, such as HTTP, are being used to implement very generic execution environments. As a result, the ability to secure a network from such protocols is becoming increasingly impossible.

The present invention however uses a packet object containing executable programs to replace the data packet in network protocols. Unlike distributed objects where the network protocol is a private communication mechanism between the interface and the implementation of an object, or networked objects where the communication between peers is defined as a set of records or data structures, the packet objects of the present invention are themselves (or contain) executable pieces of code. Since the packet object contains executable programs, it can be set up to respond to challenges posed to it by security mechanisms that are protecting a network.

Once agreement on a security interface is reached between parties wishing to communicate securely, the packet objects are designed to implement the security interface and whatever system services they are used for. The firewall or security agent at the boundary between the trusted network and the untrusted network invoke methods from the security interface on the object to determine its destination and the nature of the task that will be performed by the packet object. For example, the task to be performed by a packet object might be to reconfigure the router of a network server, to change the default network printer of a receiving computer to a specified printer, or to deliver an e-mail message. Using this methodology many new network services can be built without having to upgrade the associated network firewalls, since the packet object identifies itself and does not rely on the firewall to know the detailed data structure of the packet object.

SUMMARY OF THE INVENTION

It is a goal of the present invention to provide a flexible system and method for implementing network security protocols that avoids the need for all network users to have firewall programs that know, in advance, the data structures for request and response messages for all network protocols.

It is another goal of the present invention to provide a network security protocol system and method in which each message includes a method for securely identifying the message's sender and the message's destination and a method for delivering or implementing the message.

In summary, the present invention is a computer network having first and second network entities. The first network entity includes a packet object generator that generates a packet object including an executable source method, an executable destination method, and data associated with each of the methods. The first network entity also includes a communications interface to transmit the packet object.

The second network entity includes a communications interface to receive the packet object and an incoming packet object handler to handle the received packet object. The incoming packet object handler includes a source and destination verifier to execute the source and destination methods with their associated data so as to verify the source and destination of the received object packet.

In a preferred embodiment, the generated packet object further includes an executable main method and data associated with the main methods. The incoming packet object handler further includes a main method executer to execute the main method when the source and destination of the packet object have been verified, where the main method implements a desired function with respect to the second network entity.

In another preferred embodiment, the network includes a third network entity and the generated packet object further includes an executable main method and data associated with the main methods. The communications interface of the second network re-transmits the packet object when the source and destination of the packet object have been verified. The third network entity includes a communications interface to receive the re-transmitted packet object and an incoming packet object handler to handle the received packet object. The incoming packet object handler includes a main method executer to execute the main method to implement a desired function with respect to the third network entity.

BRIEF DESCRIPTION OF THE DRAWINGS

Additional goals and features of the invention will be more readily apparent from the following detailed description and appended claims when taken in conjunction with the drawings, in which:

DESCRIPTION OF THE PREFERRED EMBODIMENT

Figure 1:
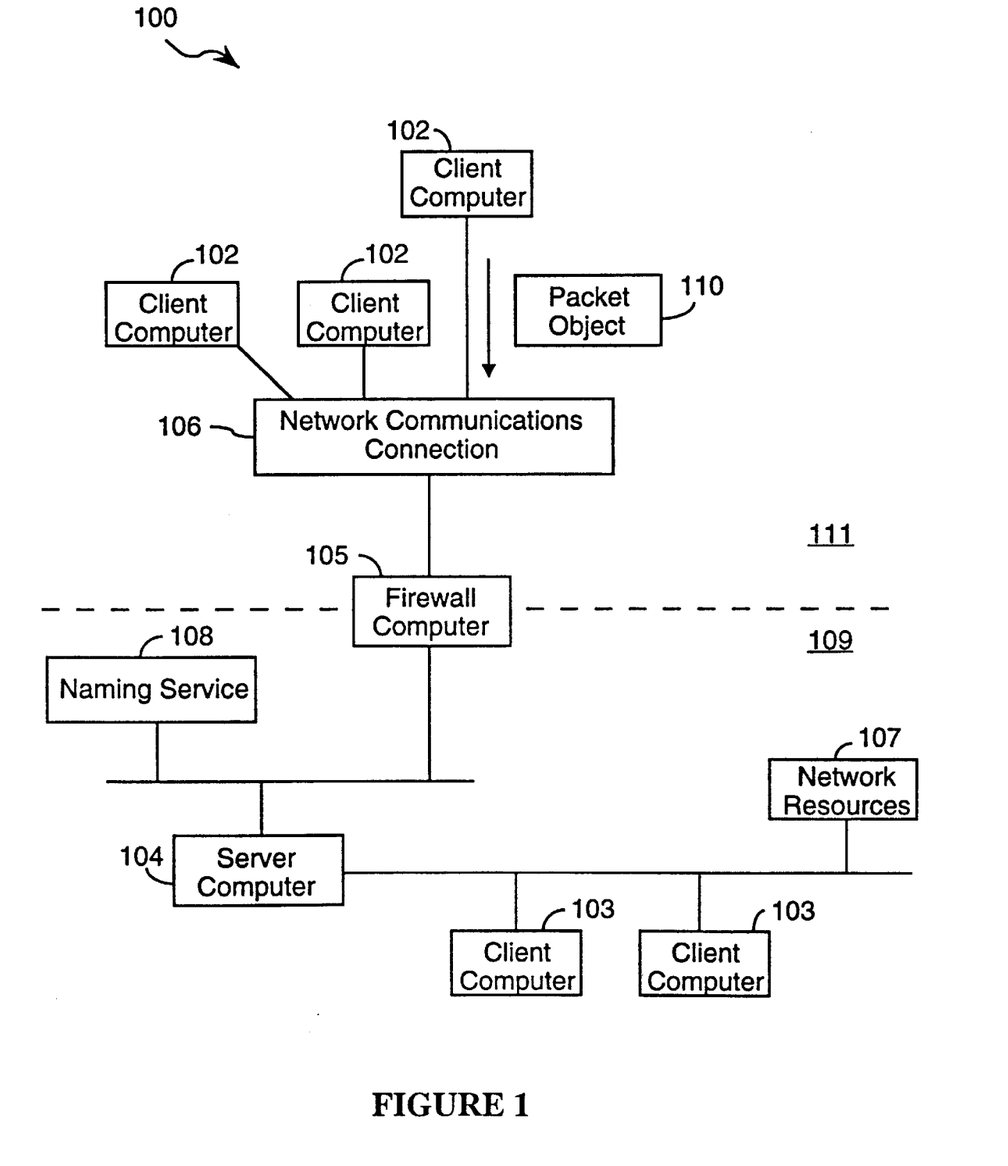
FIG. 1 is a block diagram of a distributed computer system incorporating the present invention.

Referring to FIG. 1, there is shown a distributed computer network 100 in accordance with the present invention. It comprises numerous network entities including client computers 102 and 103, a server computer 104, a firewall or sentry computer 105, network communication connections 106, network resources 107, and a naming service 108.

The firewall computer 105 establishes a protected side 109 and an unprotected side 111 of the network 100. The client and server computers 103 and 104, the network resources 107, and the naming service 108 are connected together and to the firewall computer on the protected side. The client computers 102 are connected together and to the network communications connection 106 on the unprotected side.

The network communications connection 106 connects the firewall computer 103 to the unprotected side client computers 102. The network communications connection may be a local or wide area network, an Internet connection, or some other network connection between the firewall computer and the unprotected side client computers.

Figure 2:
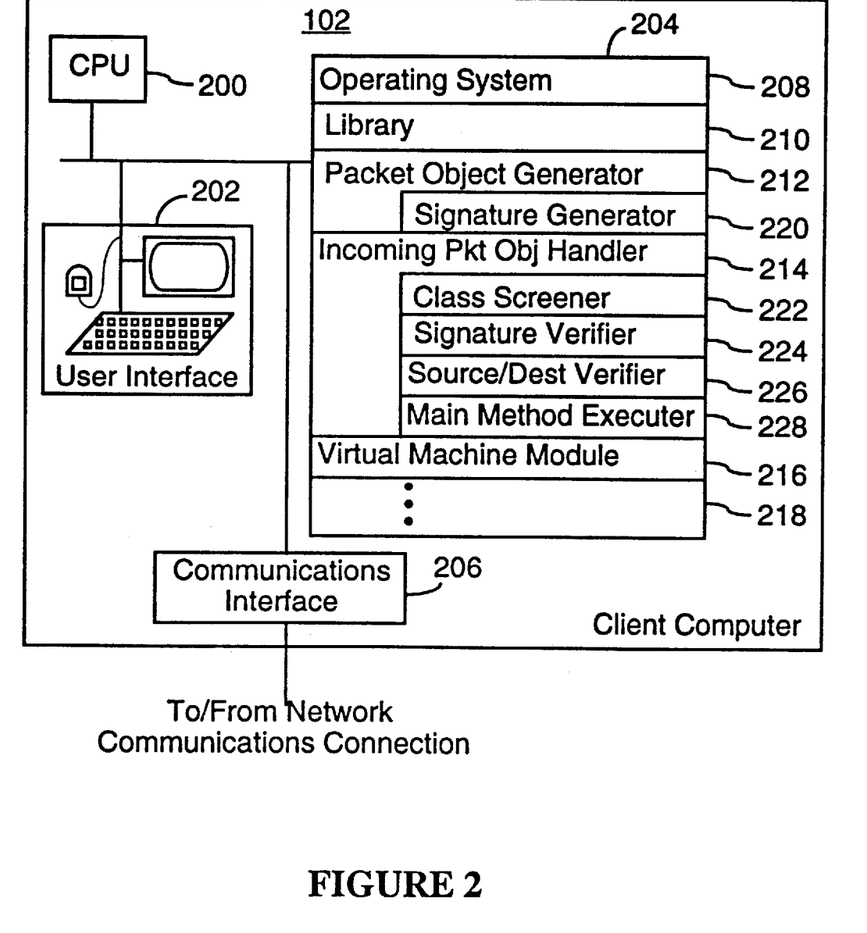
FIG. 2 is a block diagram of a client computer in accordance with the present invention.

While most of the unprotected side client computers 102 are desktop computers, such as Sun workstations, IBM compatible computers, and Macintosh computers, virtually any type of computer could be an unprotected client computer. As shown in FIG. 2, each of these client computers includes a CPU 200, a user interface 202, a memory 204, and a communications interface 206. The communications interface enables the unprotected side client computers to communicate with each other, the naming service 108, the server computer 104, and the protected side client computers 105 via the network communications connection 106 and firewall 105. The memory stores an operating system 208, a local library 210, a packet object generator 212, an incoming packet object handler 214, and a platform (or machine) independent virtual machine module 216, as well as other programs and data 218. The virtual machine module contains a set of primitives that enable the execution of platform independent programs. The virtual machine module is preferably a "Java" (a trademark of Sun Microsystems, Inc.) virtual machine module for execution of programs written in the Java language.

Figure 3:
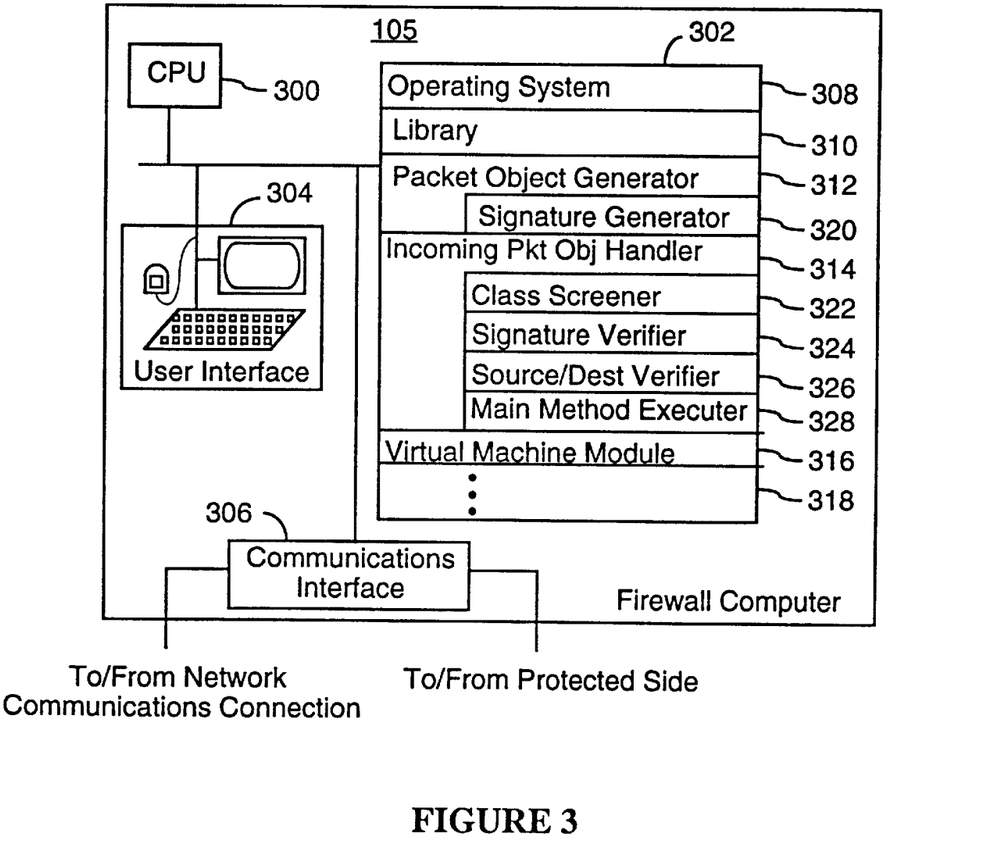
FIG. 3 is a block diagram of a firewall computer in accordance with the present invention.

Referring to FIG. 3, the firewall computer 105 includes a CPU 300, a memory 302, a user interface 304, and a communications interface 306. The communications interface enables the firewall computer to communicate with the unprotected side client computers 102 via the network communications connection 106 and to communicate with the server computer 104, the protected side client computers 103, the network resources 107, and the naming service 108 on the protected side 109. The firewall computer's memory stores an operating system 308, a local library 310, a packet object generator 312, an incoming packet object handler 314, its own platform independent virtual machine module 316, as well as other programs and data 318. The firewall computer's virtual machine module is, in most respects, functionally the same as the virtual machine module 216 of the client computer 102, except that it may have a different set of primitives. The other programs and data contain platform independent programs in the language of the virtual machine modules 216 and 316.

Figure 4:
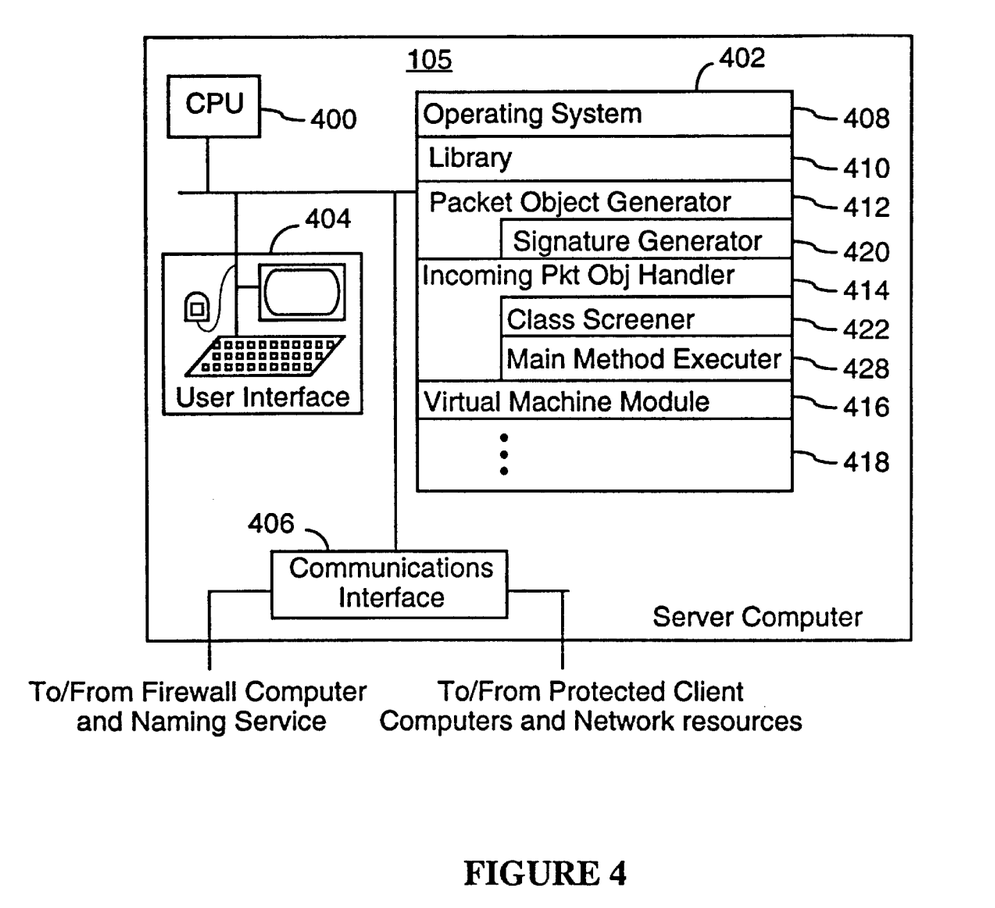
FIG. 4 is a block diagram of a server computer in accordance with the present invention.

Turning to FIG. 4, the protected side server computer 104 includes a CPU 400, a memory 402, a user interface 404, and a communications interface 406. The communications interface enables the server computer to communicate with the protected side client computers 103, the naming service 108, and the network resources 107. It also enables the server computer to communicate with the unprotected side client computers 102 through the firewall computer 105 and the network communications connection 106. For the purposes of the present discussion, it will be assumed that the server computer's memory stores an operating system 408, a local library 410, a packet generator 412, an incoming packet handler 414, its own platform independent virtual machine module 416, and other programs and data 418. The server computer's virtual machine module is, in most respects, functionally the same as the virtual machine modules 216 and 316 of the client and firewall computers 102 and 105, except that it will typically contain additional primitives to handle network management tasks such as setting a default network printer, setting network packet routing defaults, and handling the various network resources 107. The other programs and data contain platform independent programs in the language of the virtual machine modules 216, 316, and 416.

Referring again to FIG. 1, like the unprotected side client computers 102, virtually any type of computer could be a protected side client computer 103. The protected side client computers are configured similarly to the server computer 104, except that their virtual machine modules will have a different set of primitives.

Figure 5:
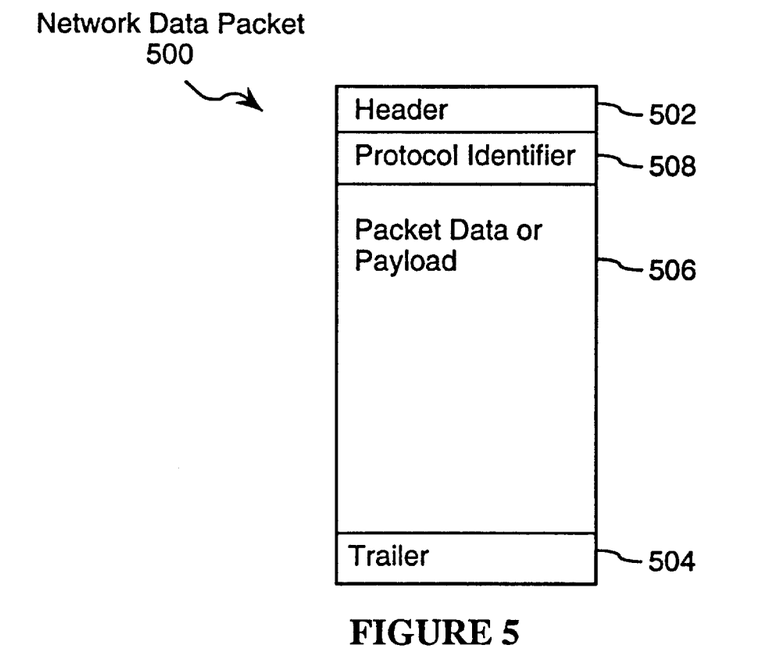
FIG. 5 is a block diagram of a prior art data packet.

Referring to FIG. 5, a typical network data packet 500 has a network header 502 and a network trailer 504, at its beginning and end, a payload 506, and a protocol identifier 508 that specifies the nature of the data stored in the payload 506. Thus, when a system receives such a data packet from a network, its network packet handler, sometimes called a firewall, inspects the protocol identifier and then handles the data packet in accordance with a corresponding protocol procedure. If the network packet handler does not recognize the protocol identifier, it will typically reject the received data packet.

Figure 6:
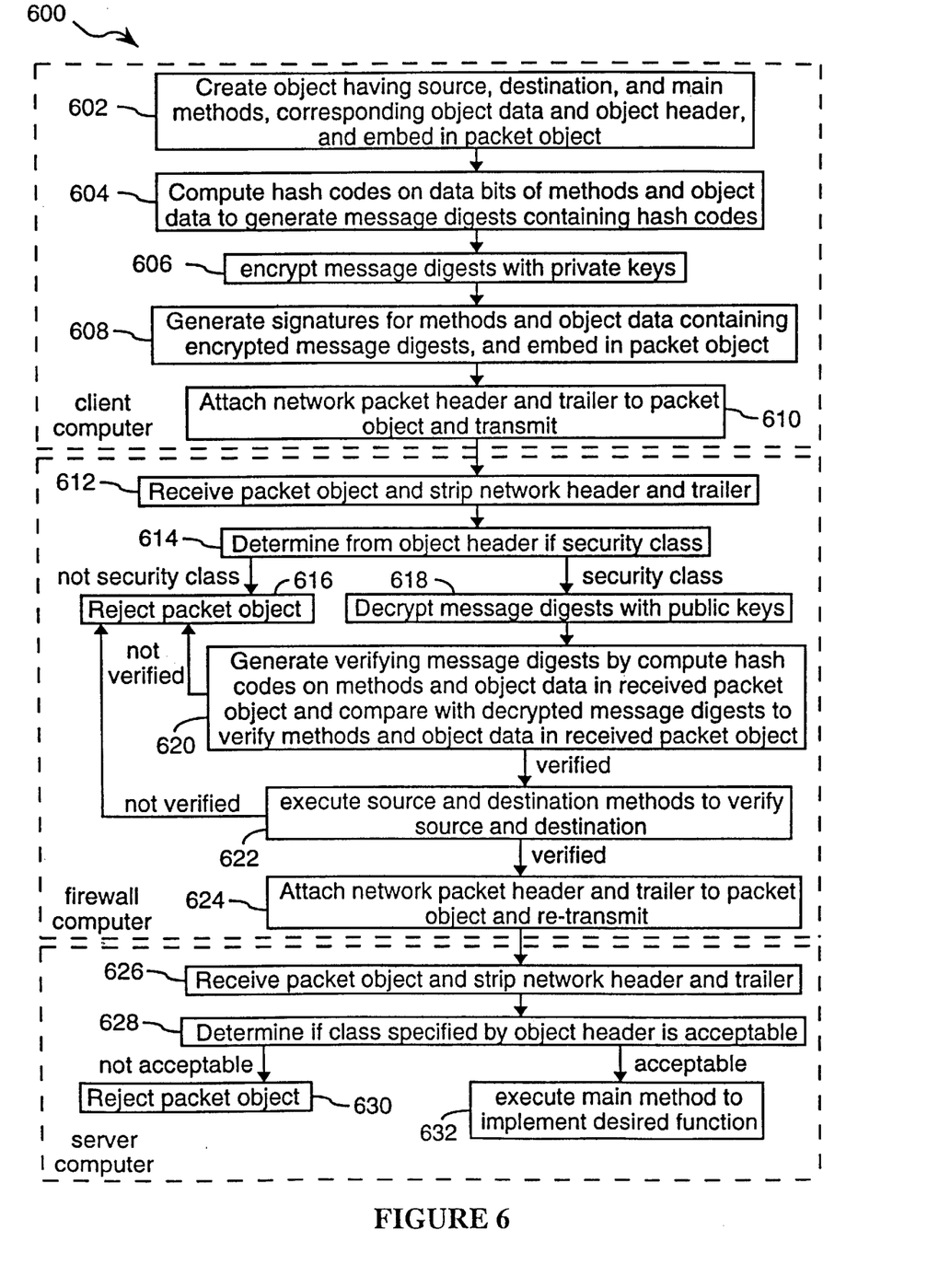
FIG. 6 is a flow chart of the secure network protocol method of the present invention.

However, referring back to FIG. 1, in the present invention, packet objects 110 may be used for communication between any of the entities of network 100 according to the method 600 shown in FIG. 6. For purposes of illustration, this type of communication will be described between an unprotected side client computer 102 and the protected side server computer 104 via the network communications connection 106 and the firewall computer 105.

Figure 7:
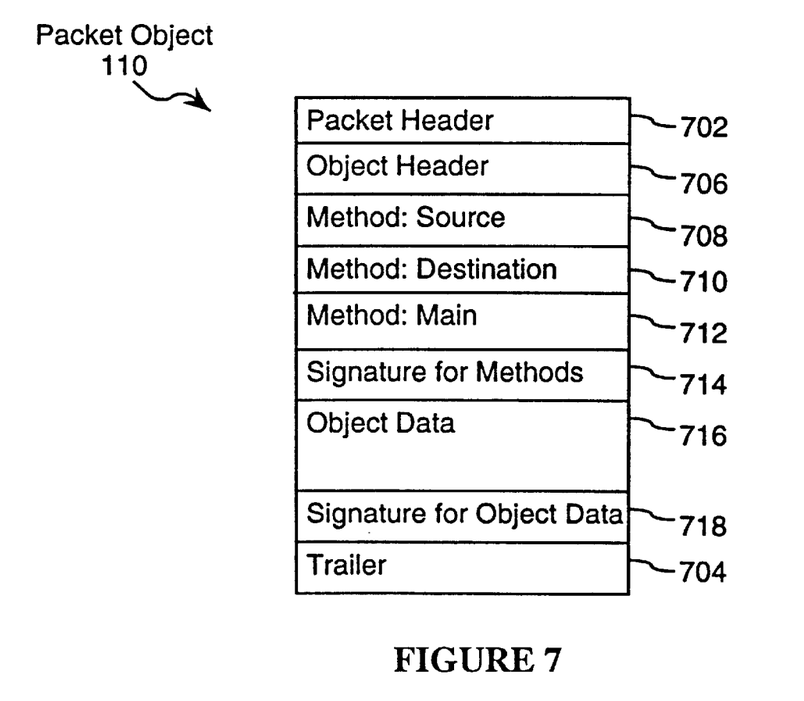
FIG. 7 is a block diagram of a packet object in a preferred embodiment of the invention.

Referring to FIGS. 1 and 2, in response to a user command initiated by a user with the user interface 112, the packet object generator 212 of an unprotected client computer 102 generates a packet object 110. As shown in FIG. 7, like a typical network data packet, each packet object includes a network header 702 and a network trailer 704, at its beginning and end.

However, unlike a typical network data packet, it includes an object header 706, an executable source method 708, an executable destination method 710, an executable main method 712, a signature 714 for the methods, object data 716, and a signature 718 for the object data.

In generating the packet object 110, the packet object generator 212 creates an object with the source, destination, and main methods 708–712, the object data 716, and the corresponding object header and embeds them in the packet object (step 602 of FIG. 6). The source, destination, and main methods contain executable code in the language of the virtual machine modules 216, 316, and 416 of the client, firewall, and server computers 102, 105, and 104. The object data contains data associated with at least some of the methods. As will be described later in greater detail, the source and destination methods will be executed by the firewall computer 105 to verify the source and destination of the packet object while the main method 712 will be executed by the server computer 104 to perform a particular function. The object header 706 specifies the class and subclass of the packet object. The packet object contains executable source and destination methods for verifying its source and destination, and in the preferred embodiment its class or superclass is called "security." The object subclass associated with each packet object is based on the function to be performed by executing the packet object's main method 712. For example, the object header may specify that the subclass of the packet object is "service" or "administration" if the function to be performed by executing the main method is network servicing or administration by the server computer 104, such as setting a default network printer, setting network packet routing defaults, or handling the various network resources 107. Or, if the function performed by executing the main method is to deliver an e-mail message, such as creating a spread sheet, the object header may specify that the packet object's subclass is "e-mail." More generally, each generated packet object is an instance of an associated object class and includes an object header that, in the preferred embodiment, identifies the packet object's class as a predefined "security" class or subclass. In the preferred embodiment, either the object class or superclass of each packet object is the "security" class.

The packet generator 212 includes a signature generator 220 that generates a message digest of the source, destination, and main methods 708–712 by computing a hash code on the data bits of these methods according to a predetermined hash function (step 604 of FIG. 6). The computed hash code and a hash function identifier (indicating the type of hash function used to generate the hash code) together form the message digest ($MD_M$) of the methods:

$$MD_M = \text{HashFunction(object's methods), HashFunction ID}$$

Similarly, the signature generator 220 generates a message digest of the object data 716 by computing a hash code on the data bits of the object data according to a predetermined hash function (step 604 of FIG. 6). This may be the same hash function used on the data bits of the methods 708–712 or a different hash function. The message digest ($MD_D$) of the object data contains the computed hash code and the corresponding hash function identifier:

$$MD_D = \text{HashFunction(object's data), HashFunction ID}$$

The signature generator 220 then encrypts each of the message digests with a corresponding encryption key contained in the client computer's library 210 (step 606 of FIG. 6). The encryption key used to encrypt the message digest of the methods 708–712 is the private key of the originator of the class (and subclass) of the packet object 110 while the encryption key used to encrypt the message digest of the object data 716 is the private key of the originator of the data (i.e., the user). The public encryption keys corresponding to these private encryption keys are stored in a naming service 108 or other trusted service to which the user and firewall computer 105 both subscribe.

The signature generator 220 then generates the signatures 714 and 718 for the methods and object data and embeds them in the packet object 110 (step 608 of FIG. 6). The signature for the methods contains the encrypted message digest of the methods 708–712 and the class originator's ID while the signature for the object data contains the encrypted message digest of the object data 716 and the user's ID.

Alternately, especially when the user is not the originator of the packet object class, the method signature 714 in the packet object may be permanently embedded in all objects of the packet object's class by the class originator because only the class originator will have access to its private key, and the signature generator 220 of the user sending the packet object only generates and embeds the data based signature 718.

The communication interface 206 then attaches the header 702 and trailer 704 to the packet object 110 and transmits the packet object. Based on the attached header, the packet object is routed to the firewall computer 105 via the network communications connection 106 (step 610 of FIG. 6). Referring to FIGS. 1 and 3, the communications interface 306 of the firewall computer 105 receives the packet object 110 and strips the header 702 and trailer 704 from the packet object (step 612 of FIG. 6). The incoming packet handler 314 then acts as a firewall or security agent to ensure that the packet object may be securely provided to the protected side 109 of the network 100.

In doing so, the class screener 322 of the incoming packet handler 314 first determines from the object header 304 whether the class of the packet object 110 is "security" (decision step 614 of FIG. 6). If it is not "security," then the class screener 322 rejects the packet object (step 616 of FIG. 6).

If the packet object's class is "security," then the signature verifier 324 of the incoming packet handler 314 decrypts the message digests in the signatures 714 and 718 for the methods and the object data with the corresponding public encryption keys stored in the library 146 (step 618 of FIG. 6). As indicated earlier, these keys may be obtained from the naming service 108.

The signature verifier 324 then determines if the source, destination, and main methods 708–712 and the object data 714 in the received packet object 110 were the ones actually sent by the client computer 102 (step 620 of FIG. 6). To do this, the signature verifier generates a verifying message digest for the methods by computing a hash code on the data bits of the source, destination, and main methods in the packet object using the hash function specified by the hash function type in the decrypted message digest for the methods. It then compares the verifying message digest with the corresponding decrypted message digest to verify that the methods received by the firewall computer 105 were those actually transmitted by the client computer 102. Similarly, the signature verifier generates a verifying message digest for the object data by computing a hash code on the data bits of the object data using the hash function specified by the hash function type in the decrypted message digest for the object data. It compares this verifying message digest to the corresponding decrypted message digest to verify that the object data received by the firewall computer was that which was actually transmitted by the client computer. If the message digests in either case do not match, then the object packet is rejected (step 616 of FIG. 6).

However, once it is determined that the methods 708–712 and the corresponding object data 716 were those that were actually transmitted by the client computer 102, then the source and destination verifier 326 of the incoming packet handler 314 determines if the packet object 110 was received from a valid source and is intended for a valid destination (step 622 of FIG. 6). It does so by executing the source and destination methods 708 and 710 using the virtual machine module 318. The source and destination methods in conjunction with their corresponding data in the object data 716 provide the source and destination verifier 326 with the source and destination of the packet object. The source and destination verifier then compares the provided source and destination with lists of acceptable sources and destination contained in the firewall computer's library 310 to determine if the packet object was received from a valid source and is intended for a valid destination. If the source and/or the destination is not acceptable, then the packet object is rejected (step 616 of FIG. 6).

Once it is determined that the source and destination are acceptable, the communications interface 306 of the firewall computer 105 attaches a new network header and a new network trailer to the packet object 110 and then transmits it (step 624 of FIG. 6). The new header is used to route the packet object to the acceptable destination.

Referring to FIGS. 1 and 4, since in this example the destination is the server computer 104, the communications interface 406 of the server computer 104 receives the packet object 110, strips its header and trailer, and passes it to the class screener 422 of the incoming packet handler 414 (step 626 of FIG. 6). The class screener then determines from the object header 304 whether the subclass of the packet object is acceptable (step 628 of FIG. 6). It does so by comparing the packet object's subclass to those contained in a list of acceptable packet object subclasses in the server computer's library 410. If it is not acceptable, then the class screener rejects the packet object (step 630 of FIG. 6). For example, if the object header indicates that the packet object's subclass is "e-mail" and the virtual machine module 416 of the server computer does not include primitives for handling e-mail, then the incoming packet handler will reject the packet object because the list of acceptable packet object subclasses will not indicate that an e-mail packet object is acceptable.

Once it is determined that the subclass of the packet object 110 is acceptable, then the main method executer 428 of the incoming packet handler 414 executes the main method 712 in conjunction with the corresponding data in the object data 714. It does so using the virtual machine module 416 to implement a desired function with respect to the server computer 104 (step 632 of FIG. 6). The executing main method may call on associated primitives contained by the virtual machine module to implement the desired function. For example, as indicated earlier, the virtual machine module may include a set of primitives for setting a default network printer, setting network packet routing defaults, and handling various network resources.

However, a network administrator may implement network policies in the primitives. For example, the network administrator may set up the primitives to implement their associated functions only for certain users. Thus, for example, when the main method 310 of a packet object 110 calls a particular primitive stored in the memory 134 of the server computer 104, the primitive will implement the associated function only if the sender has been specified in the primitive as having the authority to do so. As another example, the user of the computer receiving a packet object may set up the primitives on his/her computer to not allow his/her computer's default printer to be changed, but to allow other changes to the user's printer setup (such as changes to the list of available printers).

In the description of the method 600 of FIG. 6, communication between a network client entity (i.e., an unprotected side client computer 102) and a network execution entity (i.e., protected side server computer 104) was made through a network firewall entity (i.e., firewall computer 105). But, those skilled in the art will recognize that similar communications can be made between any of the network entities.

For example, if the destination of the object packet received by the server computer 104 from the firewall computer 105 is one of the protected side client computers 103, then the communications interface 406 of the server computer attaches an appropriate header to the object packet to route it to that client computer. Then, the client computer performs steps 626–632 of FIG. 6 described earlier to execute the main method 712 of the packet object.

As another example, an unprotected side client computer 102 may receive a packet object 110 from another unprotected side client computer, the server computer 104, the firewall computer 105, or one of the protected side client computers 103. To generate the packet object, these computers include packet object generators 212, 312, and 412. As shown in FIG. 2, to handle receiving the packet object, the unprotected side client computers 102 include an incoming packet handler that includes a class screener 222, a signature verifier 224, a source and destination verifier 226, and a main method executer 228. In this case, the class screener screens the packet object based on its class and subclass as described earlier with respect to steps 614 and 628 of FIG. 6. The signature verifier, the source and destination verifier, and the main method executer perform the steps 618–622 and 632 of FIG. 6 as described earlier. Thus, the unprotected side client computers have their own internal firewall so that only the main methods of acceptable packet objects can be executed by them.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer network having a plurality of network entities, a first one of the network entities comprising:

an object generator to generate an object that has a source and a destination and includes an executable source method, an executable destination method, and data associated with the source and destination methods;

a communications interface to transmit the generated object and to receive objects transmitted by other ones of the network entities, wherein at least a subset of the received objects each include source and destination methods and data associated with the source and destination methods; and an incoming object handler to handle the subset of the received objects, the incoming object handler including a source and destination verifier to execute the source and destination methods of one of the received objects with their associated data so as to verify the source and destination of the received object.

2. The one network entity of claim 1 wherein:

the object generator includes a signature generator to (A) generate one or more digital signatures that each include a message digest generated by performing a predetermined function on corresponding contents of the generated object, (B) encrypt each message digest with a private encryption key, and (C) embed each digital signature in the generated object;

the incoming object handler further includes a signature verifier to (A) decrypt each encrypted message digest in the one received object with a public encryption key, (B) for each encrypted message digest, generate a corresponding verifying message digest by performing the predetermined function on the corresponding contents of the one received object, and (C) compare each decrypted message digest with the corresponding verifying message digest to verify the one received object's contents.

3. The one network entity of claim 2, wherein:

the one or more digital signatures of the generated object include a methods signature for methods and a data signature for data;

the contents of the generated object corresponding to the message digest of the methods signature including the source and destination methods; and the contents of the generated object corresponding to the message digest of the data signature include the data associated with the source and destination methods.

4. The one network entity of claim 1, wherein:

the generated object is an instance of an associated object class and includes an object header that identifies the object's class as a predefined "security" class;

the incoming object handler further includes an object class screener to determine the one received object's class and reject the one received object when its class is not the "security" class.

5. The one network entity of claim 1, further including a virtual machine module to execute programs written in a predefined virtual machine language regardless of the first network entity's computer platform and operating system;

wherein the source and destination methods are written in the predefined virtual machine language and executed by the source and destination verifier with the virtual machine module.

6. The one network entity of claim 1, wherein:

the generated object further includes an executable main method and data associated with the main method;

the incoming object handler further includes a main method executer to execute the main method of the one received object with its associated data to implement a desired function after the source and destination verifier verifies the source and destination of the one received object.

7. The one network entity of claim 6, further including a virtual machine module to execute programs written in a predefined virtual machine language regardless of the first network entity's computer platform and operating system;

wherein the source and destination methods are written in the predefined virtual machine language and executed by the source and destination verifier with the virtual machine module; and the main method is written in the predefined virtual machine language and executed by the main method executer with the virtual machine module.

8. The one network entity of claim 1, wherein the communications interface includes means for re-transmitting the one received object to an identified one of the other network entities when the source and destination verifier verifies that the destination of the one received object is the identified other network entity.

9. A method of managing communicating between network entities, comprising the steps of:

at a first one of the network entities:

generating an object that has a source and a destination and includes an executable source method, an executable destination method, and data associated with the source and destination methods;

transmitting the generated object;

receiving an object transmitted by another one of the network entities, the received data packet including source and destination methods and data associated with the source and destination methods; and handling the received object, including executing the source and destination methods of the received object with their associated data so as to verify the source and destination of the received object.

10. The method of claim 9, wherein:

the step of generating the object includes (A) generating one or more digital signatures that each include a message digest generated by performing a corresponding predetermined function on corresponding contents of the generated object, (B) encrypting each message digest with a private encryption key, and (C) embedding each digital signature in the generated object;

the step of handling the received object further includes (A) decrypting an encrypted message digest in the received object with a public encryption key, (B) for each decrypted message digest, generating a corresponding verifying message digest by performing the predetermined function on the corresponding contents of the received object, and (C) comparing each decrypted message digest with the corresponding verifying message digest to verify the received object's contents.

11. The method of claim 10, wherein:

the one or more digital signatures of the generated object include a methods signature for methods and a data signature for data;

the contents of the generated object corresponding to the message digest of the methods signature include the source and destination methods; and the contents of the generated object corresponding to the message digest of the data signature include the data associated with the source and destination methods.

12. The method of claim 9, wherein:

the generated object is an instance of an associated object class and includes an object header that identifies the object's class as a predefined "security" class; and the step of handling the received object further includes determining the received object's class and rejecting the received object when its class is not the "security" class.

13. The method of claim 9, wherein:

the generated object further includes an executable main method and data associated with the main method; and the step of handling the received object further includes executing the main method of the received object with its associated data to implement a desired function after the source and destination of the received packet have been verified.

14. In a computer network having a plurality of network entities, a first one of the network entities comprising:

a communications interface to receive objects transmitted by other ones of the network entities, wherein at least a subset of the received objects each include source and destination methods and data associated with the source and destination methods; and an incoming object handler to handle the subset of the received objects, the incoming object handler including a source and destination verifier to execute the source and destination methods of each received object with their associated data so as to verify the source and destination of the received object.

15. The one network entity of claim 14 wherein:

the subset of received objects each include an embedded digital signature, the digital signature for a received object including a message digest encrypted with a private encryption key, the message digest corresponding to a result produced by performing a predetermined function on corresponding contents of the received object; and the incoming object handler includes a signature verifier to (A) decrypt the encrypted message digest in the received object with a public encryption key, (B) generate a corresponding verifying message digest by performing the predetermined function on the corresponding contents of the received object, and (C) compare the decrypted message digest with the corresponding verifying message digest to verify the received object's contents.

16. The one network entity of claim 14, wherein:

the generated object further includes an executable main method and data associated with the main method; and the incoming object handler further includes a main method executer to execute the main method of the received object with its associated data to implement a desired function after the source and destination verifier verifies the source and destination of the received object.

17. In a computer network having a plurality of network entities, a first one of the network entities comprising:

an object generator to generate an object that has a source and a destination and includes an executable source method, an executable destination method, and data associated with the source and destination methods; wherein the source and destination methods, when executed by a receiving network entity, verify the source and destination of the object; and a communications interface to transmit the generated object to the receiving network entity.

18. The one network entity of claim 17, wherein:

the generated object includes an embedded digital signature, the digital signature including a message digest encrypted with a private encryption key, the message digest corresponding to a result produced by performing a predetermined function on corresponding contents of the object; and the digital signature enables the receiving network entity to verify the received object's contents.

19. The one network entity of claim 17, wherein:

the generated object further includes an executable main method and data associated with the main method; wherein the main method, when executed by the receiving network entity, implements a desired function after the source and destination of the received object have been verified.

20. A computer data signal embodied in a carrier wave, comprising:

instructions for receiving objects transmitted by network entities, wherein at least a subset of the received objects each include source and destination methods and data associated with the source and destination methods; and an incoming object handler to handle the subset of the received objects, the incoming object handler including a source and destination verifier to execute the source and destination methods of each received object with their associated data so as to verify the source and destination of the received object.

21. The computer data signal of claim 20, wherein the subset of received objects each include an embedded digital signature, the digital signature for a received object including a message digest encrypted with a private encryption key, the message digest corresponding to a result produced by performing a predetermined function on corresponding contents of the received object; and the incoming object handler includes a signature verifier to (A) decrypt the encrypted message digest in the received object with a public encryption key, (B) generate a corresponding verifying message digest by performing the predetermined function on the corresponding contents of the received object, and (C) compare the decrypted message digest with the corresponding verifying message digest to verify the received object's contents.

22. The computer data signal of claim 20, wherein:

the generated object further includes an executable main method and data associated with the main method; and the incoming object handler further includes a main method executer to execute the main method of the received object with its associated data to implement a desired function after the source and destination verifier verifies the source and destination of the received object.

23. A computer data signal embodied in a carrier wave, comprising:

an object generator to generate an object that has a source and a destination and includes an executable source method, an executable destination method, and data associated with the source and destination methods; wherein the source and destination methods, when executed by a receiving network entity, verify the source and destination of the object; and instructions for transmitting the generated object to the receiving network entity.

24. The computer data signal of claim 23, wherein:

the generated object includes an embedded digital signature, the digital signature including a message digest encrypted with a private encryption key, the message digest corresponding to a result produced by performing a predetermined function on corresponding contents of the object; and the digital signature enables the receiving network entity to verify the received object's contents.

25. The computer data signal of claim 23, wherein:

the generated object further includes an executable main method and data associated with the main method; wherein the main method, when executed by the receiving network entity, implements a desired function after the source and destination of the received object have been verified.

* * * * *